US011008783B2

(12) United States Patent
Sakakura et al.

(10) Patent No.: US 11,008,783 B2
(45) Date of Patent: May 18, 2021

(54) VEHICLE PERIPHERY MONITORING APPARATUS

(71) Applicant: ALPHA CORPORATION, Kanagawa (JP)

(72) Inventors: Hiroaki Sakakura, Yokohama (JP); Kazuhiko Kaniwa, Yokohama (JP); Soh Saito, Yokohama (JP); Teruhisa Kato, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 0 days.

(21) Appl. No.: 16/540,913

(22) Filed: Aug. 14, 2019

(65) Prior Publication Data

US 2019/0368236 A1 Dec. 5, 2019

Related U.S. Application Data

(63) Continuation of application No. PCT/JP2018/006074, filed on Feb. 20, 2018.

(30) Foreign Application Priority Data

Feb. 20, 2017 (JP) ............................ JP2017-028675

(51) Int. Cl.
*E05B 77/24* (2014.01)
*H04N 13/204* (2018.01)
(Continued)

(52) U.S. Cl.
CPC .............. *E05B 77/24* (2013.01); *B60R 11/04* (2013.01); *E05B 81/56* (2013.01); (Continued)

(58) Field of Classification Search
None
See application file for complete search history.

(56) References Cited

U.S. PATENT DOCUMENTS

2006/0029271 A1 2/2006 Miyoshi et al.
2012/0217764 A1 8/2012 Ishiguro et al.
(Continued)

FOREIGN PATENT DOCUMENTS

CN 204488645 U * 7/2015
EP 2 500 218 A1 9/2012
(Continued)

OTHER PUBLICATIONS

International Search Report issued in PCT/JP2018/006074; dated Apr. 10, 2018.

(Continued)

*Primary Examiner* — Lindsay J Uhl
(74) *Attorney, Agent, or Firm* — Studebaker & Brackett PC

(57) ABSTRACT

A vehicle periphery monitoring apparatus mounted on a vehicle includes a first imaging unit that captures an image of a rear side and a diagonally backward, a distance detection unit that detects a distance from the vehicle to an object present in the rear side and the diagonally backward, based on the image captured by the first imaging unit, a course prediction unit that predicts a course of the object, based on transition of the distance to the object detected by the distance detection unit, and an entry prediction unit that predicts whether the object enters a door opening and closing area, based on the course of the object predicted by the course prediction unit and the door opening and closing area which is set on sides of the vehicle and defines a movable range in which side doors of the vehicle are opened and closed.

3 Claims, 4 Drawing Sheets

C
32 2 4 5 32 3 4 6
32 2 4 5 32 3 4 6

(51) Int. Cl.
*B60R 11/04* (2006.01)
*E05B 81/56* (2014.01)
*G06K 9/00* (2006.01)
*H04N 5/225* (2006.01)
*B60Q 9/00* (2006.01)
*B60R 1/00* (2006.01)

(52) U.S. Cl.
CPC ....... *G06K 9/00791* (2013.01); *H04N 5/2253* (2013.01); *H04N 13/204* (2018.05); *B60Q 9/008* (2013.01); *B60R 1/00* (2013.01); *B60R 2300/107* (2013.01); *B60R 2300/8093* (2013.01); *E05Y 2900/531* (2013.01)

(56) References Cited

U.S. PATENT DOCUMENTS

2013/0088578 A1* 4/2013 Umezawa .......... G06K 9/00805 348/47
2014/0257630 A1* 9/2014 Ruiz ....................... E05B 77/54 701/36
2016/0185292 A1 6/2016 Asai
2016/0208537 A1 7/2016 Senguttuvan et al.
2018/0157919 A1* 6/2018 Titley ...................... G06T 7/254

FOREIGN PATENT DOCUMENTS

JP 2006-050263 A 2/2006
JP 2010-196377 A 9/2010
JP 2011-105058 A 6/2011
JP 2016-124391 A 7/2016

OTHER PUBLICATIONS

Written Opinion issued in PCT/JP2018/006074; dated Apr. 10, 2018.
The extended European search report issued by the European Patent Office dated Nov. 26, 2020, which corresponds to European Patent Application No. 18754942.3-1207 and is related to U.S. Appl. No. 16/540,913.

* cited by examiner

CAMERA
5
CAMERA
6
10
11
IMAGE ACQUISITION UNIT
11a
IMAGE PROCESSING UNIT
11b
IMAGE DISPLAY UNIT
11c
DISPLAY UNIT
12
DISPLAY UNIT
12
CAN
20
21
21a
IMAGE ACQUISITION UNIT
21b
21b1
DISTANCE DETECTION UNIT
21b2
COURSE PREDICTION UNIT
21b3
ENTRY PREDICTION UNIT
21c
CONTROL UNIT
24
DISPLAY
7
ALARM LAMP
8
SPEAKER
9
30
ACTUATOR
34
LATCH
31
DOOR LOCK CONTROL UNIT
35
CAPACITANCE SENSOR
33

START
S1
PARKING?
No
Yes
S2
ACTIVATE CAMERA
S3
ACQUIRE CAPTURED IMAGE
S4
DETECT DISTANCE TO OBJECT
S5
PREDICT COURSE OF OBJECT
S6
PREDICT ENTRY TO DOOR OPENING AND CLOSING AREA
S10
STOP SECOND CAMERA
S7
No
ENTRY?
Yes
S8
No
CONTACT DETECTED ?
Yes
S9
EXECUTE CONTROL
RETURN

VEHICLE PERIPHERY MONITORING APPARATUS

CROSS-REFERENCE TO RELATED APPLICATIONS

This is a continuation of International Application No. PCT/JP2018/006074 filed on Feb. 20, 2018, and claims priority from Japanese Patent Application No. 2017-028675 filed on Feb. 20, 2017, the entire content of which is incorporated herein by reference.

TECHNICAL FIELD

The present disclosure relates to a vehicle periphery monitoring apparatus.

BACKGROUND

Conventionally, a vehicle such as an automobile is provided with an outer mirror such as a door mirror. The outer mirror is used when a driver views a rear side and a diagonally backward of the vehicle, and is provided to protrude outward on a side surface of a vehicle body. Such an outer mirror causes an increase in air resistance when the vehicle travels, and since a shape and size of the mirror are limited, an area to be a blind spot is sometimes generated for the driver.

Patent Document 1 discloses an electric mirror device in which an imaging unit such as a camera instead of an outer mirror is mounted on a vehicle. In the electric mirror device, the rear side and the diagonally backward of the vehicle are imaged by the imaging unit, and the captured image is displayed on the monitor in the cabin.

Patent Document 1: JP-A-2016-124391

Thus, the vehicle equipped with the imaging unit has increased, it has been required to effectively utilize the function of the imaging unit.

On the other hand, in a case where the occupant gets off the vehicle, when the occupant opens the door, the occupant needs to be careful about a person, a bicycle, or a car approaching from the rear of the vehicle, and it is for the occupant only to check the safety around the vehicle.

SUMMARY

According to an embodiment of the invention, it is possible to support a safety when an occupant gets off a vehicle by using an imaging unit mounted on the vehicle.

In an embodiment of the invention, there is provided a vehicle periphery monitoring apparatus mounted on a vehicle including a first imaging unit that captures images of a rear side and a diagonally backward of the vehicle. The vehicle periphery monitoring apparatus includes a distance detection unit that detects a distance to an object present in the rear and the diagonally backward of the vehicle from the vehicle, based on a plurality of images captured by the first imaging unit, a course prediction unit that predicts a course of the object, based on transition of the distance to the object detected by the distance detection unit, and an entry prediction unit that predicts whether the object enters a door opening and closing area, based on the course of the object predicted by the course prediction unit and the door opening and closing area which is set on sides of the vehicle and defines a movable range in which doors of the vehicle are opened and closed.

In an embodiment of the invention, a second imaging unit may be further provided. It is preferable that the second imaging unit is combined to the first imaging unit to constitute a stereo camera, and the distance detection unit detects a distance to the object by performing a stereo image processing, based on a plurality of images output by the first imaging unit and the second imaging unit.

In the embodiment of the invention, it is preferable that the first imaging unit is attached to the outside handle of the rear side door of the vehicle, and the second imaging unit is attached to the outside handle of the front side door of the vehicle.

In the embodiment of the invention, a control unit is further provided, and the control unit preferably performs a predetermined control, in a case where entry of the object into the door opening and closing area is predicted by the entry prediction unit.

In an embodiment of the invention, it is preferable that the door includes a door lock device including a latch to be engaged to a vehicle body, and an inside handle which is disposed on a cabin side of the door, and performs a release operation of the latch of the door lock device. In this case, it is desirable that the control unit controls the door lock device so as to prohibit the release operation of the latch by the inside handle.

According to an embodiment, since it is possible to predict whether or not the object enters the door opening and closing area by using the imaging unit mounted on a vehicle, it is possible to support the safety when an occupant gets off the vehicle.

DESCRIPTION OF EMBODIMENTS

Figure 1:
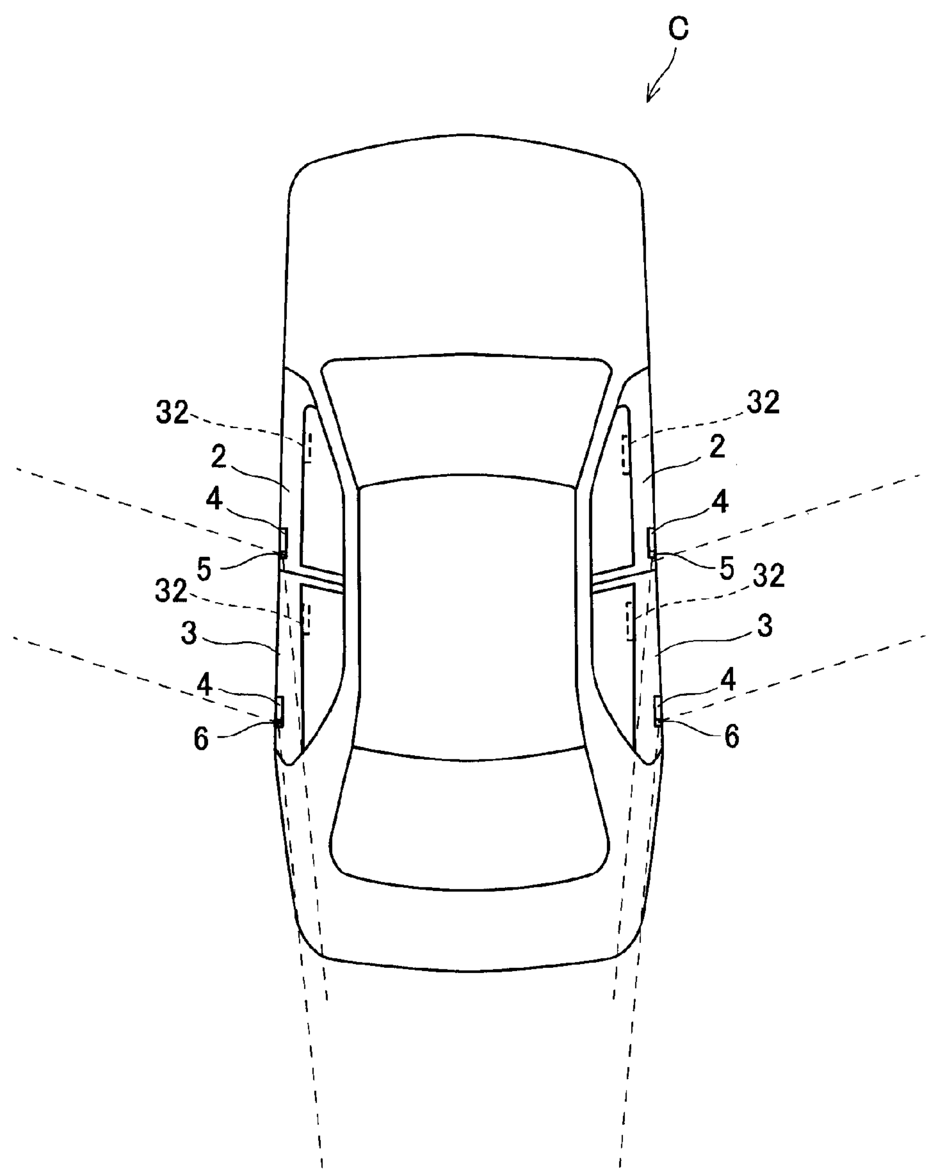
FIG. 1 is an explanatory view showing a vehicle.
Figure 2:
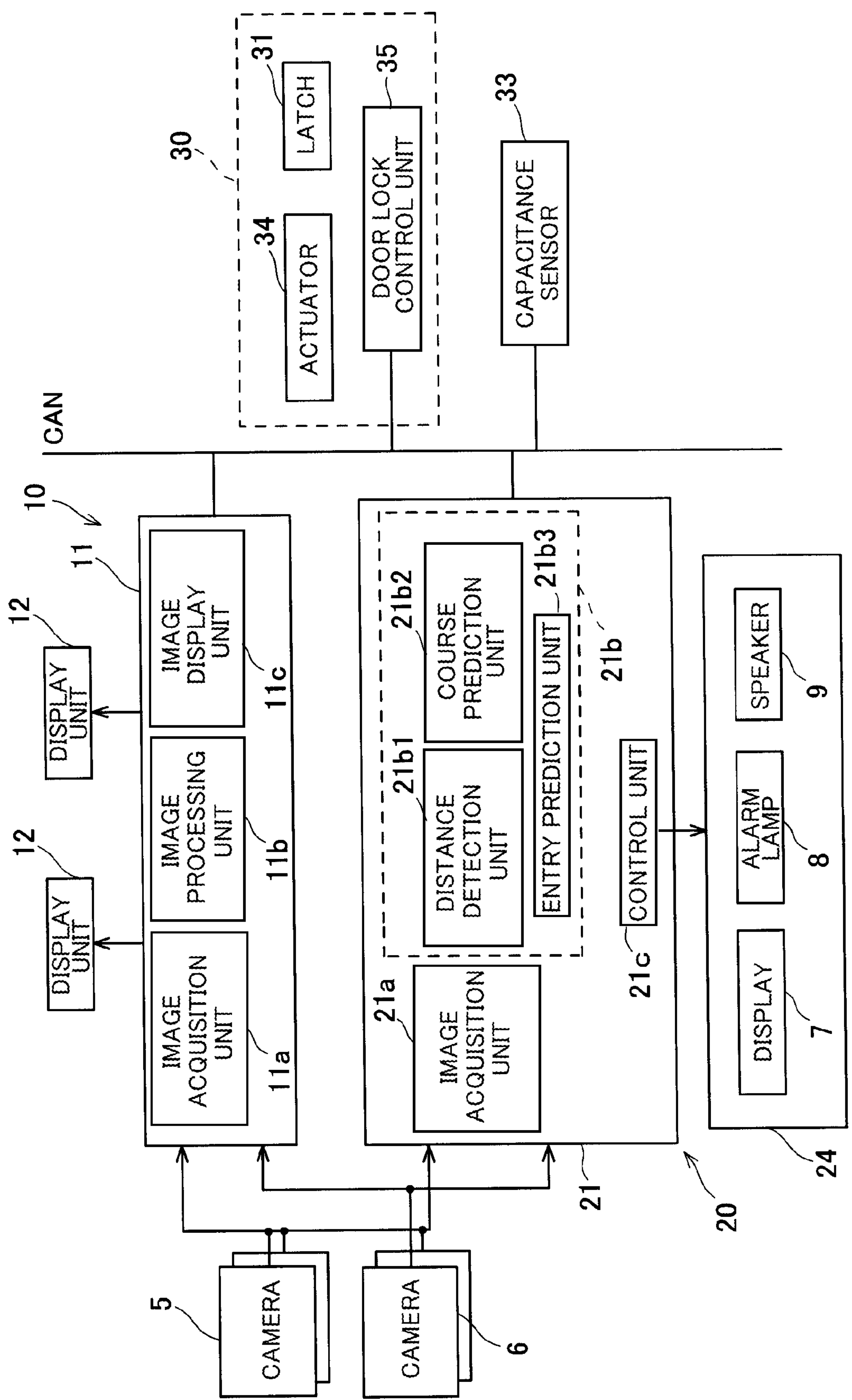
FIG. 2 is a block diagram showing a system configuration of a vehicle including a vehicle periphery monitoring apparatus according to an embodiment.

Hereinafter, a vehicle C equipped with a vehicle periphery monitoring apparatus 20 according to the embodiment will be described. FIG. 1 is an explanatory view showing the vehicle C. FIG. 2 is a block diagram showing a system configuration of the vehicle C including the vehicle periphery monitoring apparatus 20 according to the embodiment. The vehicle C according to the embodiment is, for example, an automobile of a type having a pair of left and right front side doors 2, and a pair of left and right rear side doors 3.

Each of the side doors 2 and 3 includes an outside handle 4 disposed on the outside of each of the side doors 2 and 3, and an inside handle 32 disposed on the inside (cabin side) of each of the side doors 2 and 3. The inside handle 32 is provided with a capacitance sensor 33 that detects an occupant's contact or approaches to the inside handle 32.

Further, each of the side doors 2 and 3 is provided with a door lock device 30 having a latch 31 to be engaged to the vehicle body. The latch 31 included in the door lock device 30 can be released by the outside handle 4 or the inside handle 32. The door lock device 30 includes an actuator 34 for switching between a locked state and an unlocked state, and a door lock control unit 35 that controls the actuator 34.

In a case where the door lock device 30 is in the locked state, the releasing operation of the latch 31 by the outside handle 4 or the inside handle 32 is prohibited. On the other hand, in a case where the door lock device 30 is in the unlocked state, the releasing operation of the latch 31 by the outside handle 4 or the inside handle 32 is permitted.

The vehicle C is equipped with an electric mirror device 10. The electric mirror device 10 is a device that performs rearview recognition by using an imaging unit, instead of the outer mirror such as a door mirror. The electric mirror device 10 is mainly configured with a pair of first cameras 5 on the left and right sides mounted on the vehicle C, an electronic mirror control unit 11, and a pair of display units 12 corresponding to the first cameras 5 on the left and right sides.

The first cameras 5 are respectively provided on left and right side surfaces of the vehicle body, and in the embodiment, the first cameras 5 are mounted on the outside handles 4 of the rear side doors 3. Each first camera 5 images the rear view of the vehicle C, that is, the rear side and the diagonally backward of the vehicle C (the first imaging unit). Specifically, the first camera 5 on the right side images the rear and the right diagonally backward of the vehicle C, and the first camera 5 on the left side images the rear and the left diagonally backward of the vehicle C. As the first camera 5, a digital camera using an imaging element such as a CMOS and a CCD and a wide-angle lens is preferable.

The electronic mirror control unit 11 is used to control the electric mirror device 10, and is configured with an image acquisition unit 11*a*, an image processing unit 11*b*, and an image display unit 11*c* from a functional viewpoint. As the electronic mirror control unit 11, a microcomputer which is mainly configured with a CPU, a ROM, a RAM, and an I/O interface can be used.

The image acquisition unit 11*a* is connected to the first cameras 5 on the left and right sides, and acquires from the first cameras 5 on the left and right sides, captured images obtained by imaging the rear side and the diagonally backward of the vehicle C at a predetermined period. The image processing unit 11*b* cuts the captured image acquired by the image acquisition unit 11*a* according to a predetermined cutout range to generate a display image. The image processing unit 11*b* generates right and left display images corresponding to the first cameras 5 on the left and right sides. The image display unit 11*c* receives the display image from the image processing unit 11*b*, and displays the image on the pair of display units 12. At this time, the image processing unit 11*b* displays the display image processed from the first camera 5 on the right side on the display unit 12 corresponding to the first camera 5, and displays the display image processed from the first camera 5 on the left side on the display unit 12 corresponding to the first camera 5.

The pair of display unit 12 is, for example, an organic EL display, a liquid crystal display, or the like. Each display unit 12 is connected to the electronic mirror control unit 11. A pair of display units 12 is disposed, for example, on the base end portion of each front pillar located on both sides of the windshield, in the cabin. The display unit 12 corresponding to the first camera 5 on the right side is disposed at the base end portion of the front pillar on the right side, and the display unit 12 corresponding to the first camera 5 on the left side is disposed at the base end portion of the front pillar on the left side. However, the pair of the display units 12 may be provided at another part in the cabin, for example, on an instrument panel.

As one feature of the embodiment, the vehicle C is equipped with the vehicle periphery monitoring apparatus 20. The vehicle periphery monitoring apparatus 20 is an apparatus that supports the safety when an occupant gets off the vehicle. The vehicle periphery monitoring apparatus 20 is mainly configured with a second camera 6, a monitoring control unit 21, and a notification unit 24. Incidentally, the vehicle periphery monitoring apparatus 20 not only uses the second camera 6 but also uses the first camera 5 of the rear side door 3 included in the electric mirror device 10.

The second camera 6 is combined with the first camera 5 to constitute a stereo camera and is disposed at a required position with the first camera 5 as a reference. The second cameras 6 are respectively provided on left and right side surfaces of the vehicle body, and in the embodiment, the second cameras 6 are mounted on the outside handles 4 of the front side doors 2. Similar to the first camera 5, each second camera 6 images the rear view of the vehicle C, that is, the rear side and the diagonally backward of the vehicle C (the second imaging unit). Specifically, the second camera 6 on the right side images the rear and the right diagonally backward of the vehicle C, and the second camera 6 on the left side images the rear and the left diagonally backward of the vehicle C. As the second camera 6, a digital camera using an imaging element such as a CMOS and a CCD and a wide-angle lens is preferable.

Figure 3:
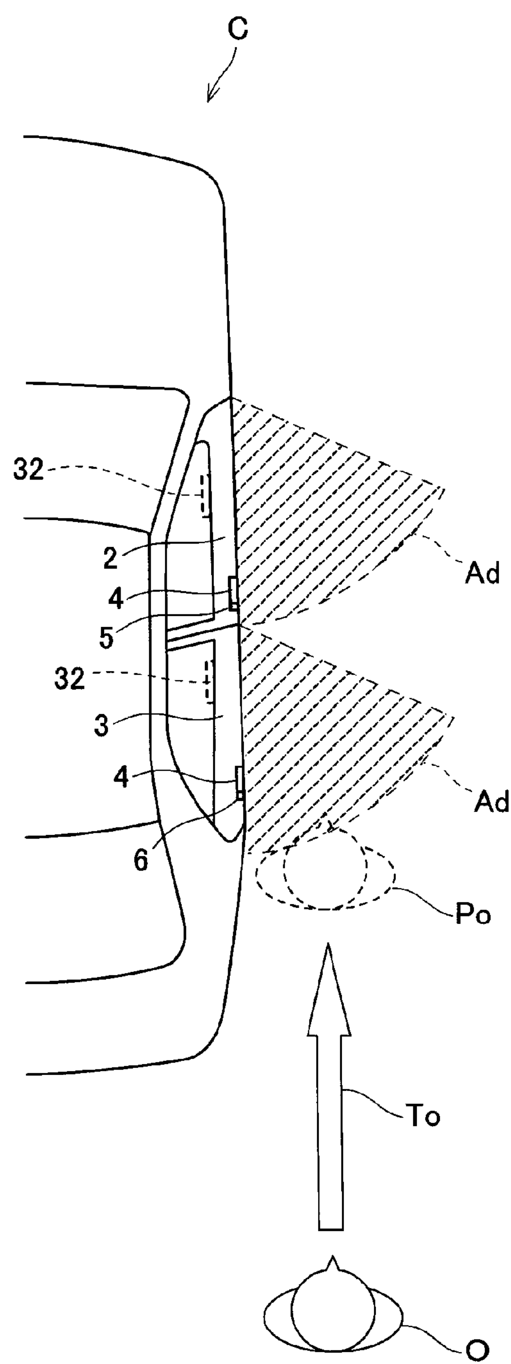
FIG. 3 is a diagram illustrating a process of predicting entry of an object into a door opening and closing area.
Figure 4:
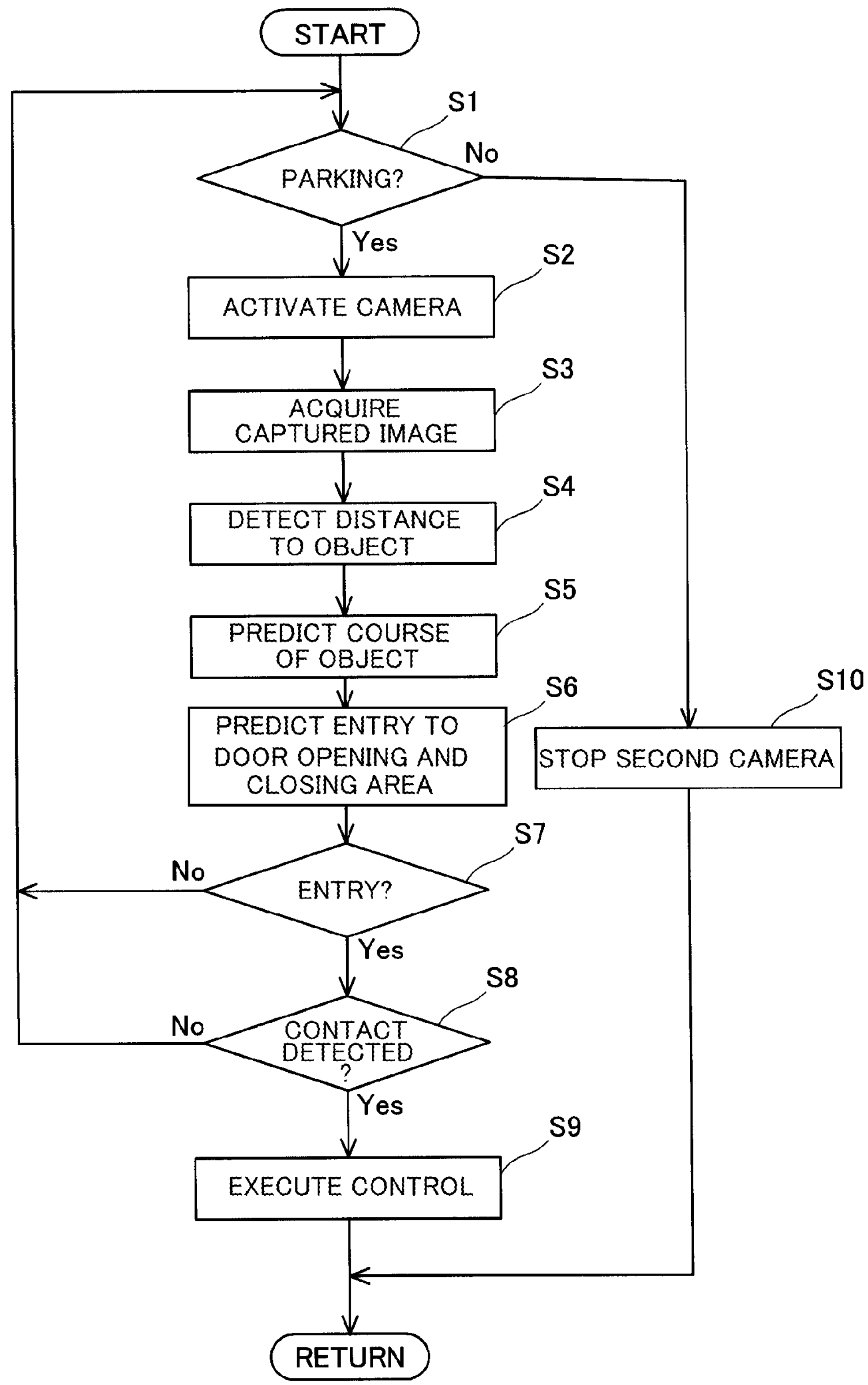
FIG. 4 is a flowchart illustrating an operation of the vehicle periphery monitoring apparatus according to the embodiment.

The monitoring control unit 21 includes an image acquisition unit 21*a*, an image processing unit 21*b*, and a control unit 21*c*. The monitoring control unit 21 performs processing described later on each of a stereo camera including the first camera 5 and the second camera 6 on the right side of a vehicle and a stereo camera including the first camera 5 and the second camera 6 on the left side of the vehicle. Here, FIG. 3 is a diagram for explaining the prediction of the entry of the object O into a door opening and closing area Ad.

The image acquisition unit 21*a* is connected to the first camera 5 and the second camera 6 constituting a stereo camera, and acquires a captured image at a predetermined period from the first camera 5 and the second camera 6.

The image processing unit 21*b* is configured to process the captured image acquired from the first camera 5 and the second camera 6. The image processing unit 21*b* is configured with a distance detection unit 21*b*1, a course prediction unit 21*b*2, and an entry prediction unit 21*b*3.

The distance detection unit 21*b*1 is configured to detect the distance to the object O by using the stereo image processing. The stereo image processing is a processing using the principle of a stereo camera for obtaining a distance to a measurement point by using parallax (difference in position) generated in two captured images when the same measurement point is imaged by two cameras. The distance detection unit 21*b*1 performs a stereo image processing, based on the pair of captured images obtained by the first camera 5 and the second camera 6. Through the stereo image processing, the object O and the distance from the vehicle C to the object O are detected.

The course prediction unit 21*b*2 predicts the course of the object O, based on the transition of the distance to the object O to be detected by the distance detection unit 21*b*1.

The entry prediction unit 21*b*3 predicts whether the object O enters the door opening and closing area Ad, based on the course of the object O predicted by the course prediction unit 21*b*2 and the door opening and closing area Ad which is set on sides of the vehicle C. Here, the door opening and closing areas Ad define a movable range in which side doors 2 and 3 of the vehicle C are opened and closed, and are provided corresponding to the front side door 2 and the rear side door 3 provided in the vehicle C, respectively.

The control unit 21*c* controls the vehicle periphery monitoring apparatus 20. Specifically, the control unit 21*c* performs a predetermined control, in a case where entry of the object O into the door opening and closing area Ad is predicted by the entry prediction unit 21*b*3. In the embodiment, predetermined control performed by the control unit 21*c* is notification control using the notification unit 24, or lock control using the door lock device 30.

The notification unit 24 is configured to notify the occupant of the predetermined information. As the notification unit 24, a display 7 for navigation provided in an instrument panel, an alarm lamp 8 in a meter device provided with a speed meter or the like disposed therein, or a speaker 9 can be used.

A controller area network (CAN) is provided in the vehicle C. The electric mirror device 10 and the vehicle periphery monitoring apparatus 20 are connected to the CAN, and are capable of communicating with each other. Further, the vehicle periphery monitoring apparatus 20 can communicate with various sensors and various control system mounted on the vehicle C through the CAN.

Specifically, the vehicle periphery monitoring apparatus 20 can communicate through the CAN, detection signals of the capacitance sensor 33 provided in the inside handle 32, and the door lock control unit 35 that controls the actuator 34. Further, the vehicle periphery monitoring apparatus 20 can obtain a shift position signal through the CAN.

FIG. 3 is a flowchart illustrating an operation of the vehicle periphery monitoring apparatus 20 according to the embodiment. The processing shown in this flowchart is executed when the ignition switch of the vehicle C is turned on.

First, in step 1 (S1), the control unit 21*c* determines whether the current shift position is parking (P), based on the shift position signal. In a case where the shift position is parking, an affirmative determination is made in step 1, and the process proceeds to step 2. On the other hand, in a case where the shift position is not parking, a negative determination is made in step 1, and the process proceeds to step 10 (S10) to be described later.

In step 2, the control unit 21*c* activates the second camera 6, and activates the first camera 5 through the electric mirror device 10. In a case where the first camera 5 and the second camera 6 are already activated, the step 2 can be skipped.

In step 3 (S3), the image acquisition unit 21*a* acquires captured images from the first camera 5 and the second camera 6, respectively. Thus, a pair of captured images including the captured image acquired from the first camera 5, and the captured image acquired from the second camera 6 is acquired.

In step 4 (S4), the distance detection unit 21*b*1 performs a stereo image processing based on a pair of captured images. In the stereo image processing, one captured image is compared with the other captured image to calculate a difference in position in images where the same subject is captured, namely, parallax. By the principle of triangulation, the distance to the subject projected on the captured image is calculated based on the calculated parallax. Then, based on the calculated distance to the subject, surrounding scenery and the object O such as a person, a two-wheeled vehicle, or an automobile are classified, and the object O is detected. The object O is associated with the distance to the object O (a position in the real space with the stereo camera as a reference). Thus, the object O and the distance to the object O are detected.

In step 5 (S5), the course prediction unit 21*b*2 predicts the course of the object O. The above-described distance detection unit 21*b*1 calculates the distance to the object O in time series, corresponding to the acquisition period of the captured image by the image acquisition unit 21*a*. Therefore, the course prediction unit 21*b*2 predicts the course of the object O, based on the transition of the distance to the object O detected by the distance detection unit 21*b*1. For example, the course prediction unit 21*b*2 calculates the relative velocity and the moving direction of the current object O, and an arrival position Po of the object O after a predetermined time and a movement locus To to reach the arrival position Po are predicted as a course (see FIG. 3).

In step 6 (S6), the entry prediction unit 21*b*3 predicts whether or not the object O enters the door opening and closing area Ad, based on the course of the object O predicted by the course prediction unit 21*b*2 and the door opening and closing area Ad set in the side of the vehicle C. Specifically, in a case where the predicted course of the object O, that is, the arrival position Po or the movement locus To is included in any of the door opening and closing areas Ad, the entry prediction unit 21*b*3 predicts whether or not the object O enters the door opening and closing area Ad. On the other hand, in a case where the predicted arrival position Po or movement locus To is not included in any of the door opening and closing areas Ad, it is predicted that the object O does not enter the door opening and closing area Ad.

In step 7 (S7), the control unit 21*c* determines whether or not there is an entry of the object O into the door opening and closing area Ad. In a case where there is an entry of the object O, an affirmative determination is made in step 7, and the process proceeds to step 8 (S8). On the other hand, in a case where there is no entry of the object O, a negative determination is made at step 7, and the process returns to step 1.

In step 8, the control unit 21*c* refers to the detection signal of the capacitance sensor 33, and determines whether or not the contact of the human body with the inside handle 32 is detected. In a case where the contact of the human body with the inside handle 32 is detected, an affirmative determination is made in step 8, and the process proceeds to step 9 (S9). On the other hand, in a case where the contact of the human body with the inside handle 32 is not detected, a negative determination is made in step 8, and the process returns to step 1.

In step 9, the control unit 21*c* performs one or both of the two controls described below, and the present routine ends (RETURN).

(1) Notification Control

The control unit 21*c* controls the notification unit 24 to make a notification to the occupant. The notification is intended to call attention to the entry of the object O to the movable range of the side doors 2 and 3. Methods for notification include display of an abnormal state using the display 7 or the alarm lamp 8, audio output or alarm sound output using the speaker 9, and the like.

Further, the control unit 21*c* may display the captured image acquired from the first camera 5 or the second camera 6 on the display 7. At this time, the control unit 21*c* may perform an image processing such that the object O of which entry is predicted is highlighted, and display the captured image on the display 7.

(2) Lock Control

The control unit 21*c* controls the door lock device 30 through the door lock control unit 35 so as to set the door lock device 30 to be in the locked state. In this locked state, the releasing operation of the latch 31 by the inside handle 32 is prohibited. Thus, the opening of the side doors 2 and 3 is regulated.

In step 10 (S10), the control unit 21*c* controls the second camera 6 to be stopped, and exits the present routine (RETURN). In a case where the second camera 6 is not activated, this step can be skipped.

As described above, in the embodiment, the vehicle periphery monitoring apparatus 20 is mounted on a vehicle C equipped with a first camera 5 that images the rear side and the diagonally backward of the vehicle C, and includes (1) the distance detection unit 21*b*1 that detects a distance to an object O present in the rear side and the diagonally backward of the vehicle C, based on the captured images output from the first camera 5, (2) the course prediction unit 21*b*2 that predicts a course of the object O, based on transition of the distance to the object O detected by the distance detection unit 21*b*1; and (3) the entry prediction unit 21*b*3 that predicts whether the object O enters a door opening and closing area Ad, based on the course of the object O predicted by the course prediction unit 21*b*2 and the door opening and closing area Ad which is set on sides of the vehicle C and defines a movable range in which side doors 2 and 3 of the vehicle C are opened and closed.

According to this configuration, since the image captured by the first camera 5, it is possible to detect the distance to the object O present in the rear side or the diagonally backward of the vehicle C. Then, it is possible to predict the course of the object O from this distance. Thus, since the entry of the object O to the movable ranges of the side doors 2 and 3 can be predicted, it is possible to support the safety when an occupant gets off the vehicle.

In particular, the object O appearing from the rear of the vehicle C is likely to enter the blind spots of the occupant, and the approaching speed of a two-wheeled vehicle or the like is high, so the object may suddenly appear without the occupant noticing it. Therefore, by using the first camera 5 of the electric mirror device 10 covering the area including the rear, it is possible to appropriately detect of the object O on the rear to be paid more attention. This makes it possible to effectively support the safety when an occupant gets off the vehicle.

Further, in the embodiment, the vehicle periphery monitoring apparatus 20 further includes a second camera 6 which is combined with the first camera 5 to constitute a stereo camera, in which the distance detection unit 21*b*1 detects a distance to the object O present in the rear side and the diagonally backward of the vehicle C, based on the captured images output from the first camera 5 and the second camera 6. In this case, the first camera 5 is attached to the outside handle 4 of the rear side door 3 of the vehicle C, and the second camera 6 is attached to the outside handle 4 of the rear side door 3 of the vehicle C.

According to this configuration, it is possible to construct a stereo camera only by a second camera 6, by using the first camera 5 of the electric mirror device 10 mounted on the vehicle C. Thus, the distance to the object O can be properly detected from a pair of captured images output from the cameras 5,6.

Further, according to this configuration, by sharing the first camera 5, the vehicle periphery monitoring apparatus 20 can be constructed inexpensively. Further, the electric mirror device 10 uses the captured image output from the first camera 5 when the vehicle C travels, but the vehicle periphery monitoring apparatus 20 uses the captured image output from the first camera 5 at the stop of the vehicle C where an occupant can get off. Therefore, the first camera 5 can be used with different functions at the time of traveling and at the time of stopping, and the first camera 5 and its captured image can be effectively utilized.

In the embodiment, the distance to the object O is detected by using the first camera 5 and the second camera 6. However, for the method of detecting the distance to the object O, a radar such as a laser radar or a millimeter wave radar may be used together in addition to the second camera 6 if the image captured by the first camera 5 is utilized.

Further, according to the embodiment, the first camera 5 and the second camera 6 are attached to the outside handles 4 provided outside the side doors 2 and 3 of the vehicle C. According to this configuration, even in a vehicle C in which the outer mirror is not in the vehicle body side, the camera 5 can be disposed at a place where the rear view can be obtained. This makes it possible to appropriately detect an object O approaching from the rear side and the diagonally backward.

Further, according to the embodiment, the first camera 5 of the electric mirror device 10 is attached to the outside handle 4 of the rear side door 3. Thus, the first camera 5, which is also used in the electric mirror device 10, can be installed in a state where reflection of the vehicle body is small.

In the embodiment, the first camera 5 and the second camera 6 are attached to the outside handle 4, but may be disposed in any place as long as a rear view can be obtained and the stereo camera can be constituted. For example, the first camera 5 is disposed in the outside handle 4, and the second camera 6 is disposed at any position of vehicle body in the vertical direction of the first camera 5.

Further, in the embodiment, the vehicle periphery monitoring apparatus 20 includes the control unit 21*c* that performs a predetermined control, in a case where entry of the object O into the door opening and closing area Ad is predicted by the entry prediction unit 21*b*3.

In this case, in a case where entry of the object O into the door opening and closing area Ad is predicted, the control unit 21*c* can control the notification unit 24 so as to perform a notification to the occupant.

According to this configuration, it is possible to call an occupant's attention to a fact that the entry of the object O to the movable range of the side doors 2 and 3 is predicted. As a result, the situation that the occupant opens the side doors 2 and 3 without noticing the object O can be suppressed.

Further, in a case where the entry of the object O to the door opening and closing area Ad is predicted, the control unit 21*c* controls the door lock device 30 so as to prohibit the release operation of the latch 31 by the inside handle 32.

According to this configuration, even if an occupant operates the inside handle 32, the opening of the side doors 2 and 3 can be regulated. Thus, it is possible to suppress the situation that the side doors 2 and 3 are opened in a situation where the entry of the object O to the movable range of the side doors 2 and 3 is predicted.

The vehicle periphery monitoring apparatus 20 according to the embodiment has been described above, but various deformations are possible for the vehicle periphery monitoring apparatus 20.

In the above-described embodiment, the control unit 21*c* performs a predetermined control on condition that the entry of the object O into the door opening and closing area Ad is predicted and the occupant comes into contact with the inside handle 32. However, the predetermined control by the control unit 21*c* may be executed only when the entry of the object O into the door opening and closing area Ad is predicted. However, by adding the condition that the occupant comes into contact with the inside handle 32, the situation that the control by the control unit 21*c* is executed can be suppressed even though the occupant has no intention to get off the vehicle.

In the above-described embodiment, in order to determine the occupant's opening operation of the side doors 2 and 3, contact with the inside handle 32 is determined by the capacitance sensor 33. However, the detection of the opening operation is not limited thereto. For example, an opening operation detection unit that detects the turning operation of the inside handle 32 or detects a state in which the side doors 2 and 3 are slightly opened may be provided.

In the embodiment in which the cameras 5, 6 are mounted on the outside handle 4, the control unit 21*c* can detect the state where the side doors 2 and 3 are opened, by using the captured images from the cameras 5, 6. In other words, in a case where the side doors 2 and 3 are opened, the angle of view of the cameras 5, 6 provided on the outside handle 4 is also deviated, so the position of the vehicle body reflected in the captured image is deviated. Therefore, the control unit 21*c* may determine the positional deviation and detect that the side doors 2 and 3 are opened.

In the embodiment, the opening of the side doors 2 and 3 is invalidated by prohibiting the release operation of the latch 31 by the inside handle 32. However, the control unit 21*c* may perform control for regulating the turning operation of the side doors 2 and 3 at the moment when the side doors 2 and 3 in the closed state are turned in the open direction.

In the above-described embodiment, the entry of the object O to the door opening and closing area Ad is predicted for all side doors 2 and 3, regardless of whether an occupant is seated or not. However, the vehicle periphery monitoring apparatus 20 may include an occupant detection unit that detects the occupant's seating for each seat on which the occupant sits. In this case, the entry prediction unit 21*b*3 may predict whether the object O enters the door opening and closing area Ad, by limiting the target to the side doors 2 and 3 corresponding to the seats for which seating is detected by the occupant detection unit.

Further, the entry prediction unit 21*b*3 may predict whether or not the object O enters the door opening and closing area Ad by limiting the target to the rear side door 3, without determining the seating. This is because the vehicle periphery monitoring apparatus 20 assumes the object O approaching from the rear of the vehicle C.

Further, the entry prediction unit 21*b*3 may change the entry prediction sensitivity of the object O to the door opening and closing area Ad, according to the moving speed of the object O. For example, in a case where the moving speed of the object O is fast, it is preferable to perform the notification control or lock control earlier as compared with the case where the moving speed is slow. Accordingly, the entry prediction unit 21*b*3 increases the entry prediction sensitivity, in a case where the relative speed of the object O to be predicted is high. As a method for increasing the entry prediction sensitivity, a virtual door opening and closing area is additionally set outside the door opening and closing area Ad, or the course prediction unit 21*b*2 is instructed to lengthen the time set for the arrival position Po.

In the detection method of the object O using a captured image, it is possible to recognize the size of the object O. Therefore, the entry prediction unit 21*b*3 may change the entry prediction sensitivity of the object O to the door opening and closing area Ad, according to the size of the object O. For example, the object O is classified into a two-wheeled vehicle and a pedestrian, and the entry prediction sensitivity of the two-wheeled vehicle is made higher than that of the pedestrian.

In the embodiment, the control unit 21*c* performs one or both of the notification control and lock control, in a case where entry of the object O into the door opening and closing area Ad is predicted. However, control performed by the control unit 21*c* may be other than this. For example, the control unit 21*c* may transmit a prediction result to another control system (external equipment) mounted on the vehicle C. Thus, the control system receiving the prediction result can perform processing such as performing notification by using the notification unit provided in the system and deactivating the equipment that constitutes the system.

The vehicle periphery monitoring apparatus according to the embodiment has been described above, but it goes without saying that the invention can be variously modified within the scope of the invention, without being limited to the above-described embodiment.

For example, in the embodiment, a side door is exemplified as a vehicle door but the vehicle door may be a back door opened backward.

The present application is based on Japanese Patent Application (Japanese Patent Application No. 2017-028675) filed on Feb. 20, 2017, the contents of which are incorporated by reference in the present application.

REFERENCE SIGNS LIST

C vehicle
2, 3 side door
4 outside handle
5 camera (first camera)
6 camera (second camera)
7 display
8 alarm lamp
9 speaker
10 electric mirror device
11 electronic mirror control unit
21 display unit
20 vehicle periphery monitoring apparatus
21 monitoring control unit
21*a* image acquisition unit
21*b* image processing unit
21*b*1 distance detection unit
21*b*2 course prediction unit
21*b*3 entry prediction unit
21*c* control unit
24 notification unit
30 door lock device
31 latch
32 inside handle
33 capacitance sensor
34 actuator
35 door lock control unit

The invention claimed is:

1. A vehicle periphery monitoring apparatus mounted on a vehicle, the vehicle periphery monitoring apparatus comprising:

a first imaging unit that captures an image of a rear side and a diagonally backward of the vehicle;

a second imaging unit; and a processor configured to detect a distance to an object present in the rear side and the diagonally backward of the vehicle from the vehicle, based on the image captured by the first imaging unit;

predict a course of the object, based on transition of the distance to the object which is detected; and predict whether the object enters a door opening and closing area, based on a course of the object which is predicted and the door opening and closing area which is set on sides of the vehicle and defines a movable range in which doors of the vehicle are opened and closed, wherein the first imaging unit is attached to an outside handle of a front side door of the vehicle, wherein the second imaging unit is attached to an outside handle of a rear side door of the vehicle, wherein the second imaging unit constitutes a stereo camera in combination with the first imaging unit, and wherein the processor detects the distance from the vehicle to the object by performing a stereo image processing, based on a plurality of images captured by the first imaging unit and the second imaging unit.

2. The vehicle periphery monitoring apparatus according to claim 1, wherein the processor performs at least one of a notification control and a lock control regulating a turning operation of the door, in a case where an entry of the object into the door opening and closing area is predicted by the entry prediction unit.

3. The vehicle periphery monitoring apparatus according to claim 2, wherein the door includes:

a door lock device including a latch to be engaged to a vehicle body; and an inside handle which is disposed on a cabin side of the door, and performs a release operation of the latch of the door lock device, and wherein the processor controls the door lock device so as to prohibit the release operation of the latch by the inside handle.

* * * * *